United States Patent
Chen et al.

(10) Patent No.: US 8,545,695 B2
(45) Date of Patent: Oct. 1, 2013

(54) WATER PROVISIONING SYSTEM FOR KITCHEN

(75) Inventors: Shih-Chang Chen, Hukou Township, Hsinchu County (TW); Tsair-Rong Chen, Hukou Township, Hsinchu County (TW); Shih-Chien Tsai, Hukou Township, Hsinchu County (TW); Chun-Lung Chiu, Hukou Township, Hsinchu County (TW); Chih-Chung Cheng, Hukou Township, Hsinchu County (TW); Che-Wei Hsu, Hukou Township, Hsinchu County (TW)

(73) Assignee: Cashido Corporation, Hsinchu County (TW)

( * ) Notice: Subject to any disclaimer, the term of this patent is extended or adjusted under 35 U.S.C. 154(b) by 562 days.

(21) Appl. No.: 12/897,747

(22) Filed: Oct. 4, 2010

(65) Prior Publication Data
US 2012/0080364 A1  Apr. 5, 2012

(51) Int. Cl.
 *C02F 1/78* (2006.01)
 *B01D 61/08* (2006.01)
 *B01D 61/10* (2006.01)

(52) U.S. Cl.
 USPC ............ 210/86; 210/104; 210/109; 210/135; 210/192; 210/198.1; 210/321.6; 210/257.1; 210/260

(58) Field of Classification Search
 USPC ................. 210/86, 104, 109, 110, 135, 192, 210/198.1, 321.6, 257.1, 260
 See application file for complete search history.

(56) References Cited

U.S. PATENT DOCUMENTS

| | | | | |
|---|---|---|---|---|
| 3,786,924 A * | 1/1974 | Huffman | ................. | 210/257.2 |
| 5,976,363 A * | 11/1999 | Monroe et al. | ................. | 210/90 |
| 2003/0024568 A1* | 2/2003 | Bowman | ................. | 137/217 |
| 2005/0040087 A1* | 2/2005 | Jacuzzi | ................. | 210/109 |

* cited by examiner

*Primary Examiner* — Terry Cecil
(74) *Attorney, Agent, or Firm* — Leong C. Lei (57) ABSTRACT

The water provisioning system mainly contains a selection switch, a water volume switch, a human-machine interface (HMI), a RO waste water recycling device, an electromagnetic valve, a RO water purification device, an antichlor device, an aeration pipe assembly, a first ozone module, and a second ozone module. The selection switch selects a type of water to use. The RO water purification device filters water from a low-temperature water source, stores purified water in a storage barrel, and provides high-quality drinking water. The 70% water from the RO water purification process that fails the drinking water standard is recycled through the RO waste water recycling device. The low-temperature water source is connected to an antichlor device and the water is therefore dechlorinated. The first and second ozone modules are used to produce ozonated water and to release ozone through the aeration pipe assembly into the kitchen cabinet for deodorization and sterilization.

13 Claims, 8 Drawing Sheets

WATER PROVISIONING SYSTEM FOR KITCHEN

TECHNICAL FIELD OF THE INVENTION

The present invention generally relates to water supply in kitchen, and more particular to a system integrating various water processing devices and capable of expelling insects from the kitchen cabinets.

DESCRIPTION OF THE PRIOR ART

In recent days, a kitchen cabinet is not just a simple place for food treatment and preparation. There are one or more sinks for cleaning and drainage. The left over could be processed by a garbage disposal. Additionally there are also water filtering and purification devices to provide clean drinking water. As such, the kitchen cabinet is crowded with various faucets, and these devices require plenty of room to accommodate. Further more, the kitchen is often a perfect breeding ground for various insects such as roaches, and toxicants are commonly used to eliminate these insects. However, using toxicants in kitchen presents a potential hazard to food contamination.

SUMMARY OF THE INVENTION

A major objective of the present invention is to provide a water provisioning system containing a selection switch, a water volume switch, a human-machine interface (HMI), a RO waste water recycling device, an electromagnetic valve, a RO water purification device, an antichlor device, an aeration pipe assembly, a first ozone module, and a second ozone module. The selection switch is integrated with a water provisioning pipe and the water volume switch is to detect whether there is water flowing and transmits a signal to the HMI, which in turn controls the on/off of the electromagnetic valve and a submersible pump in the RO waste water recycling device. The RO waste water recycling device further has a level controller to determine the amount of water contained. When water for cleaning food is selected, the water in the RO waste water recycling device is used first before it reaches a low level. Then the level controller notifies the HMI to turn off the submersible pump and turn on the electromagnetic valve so as to switch to use ordinary tap water. If drinking water is selected, the water from the RO water purification device after filtering the water from a low-temperature water source (i.e., tap water) is provided. If the water from the low-temperature water source, the low-temperature water source is connected to an antichlor device and the water is dechlorinated.

A second objective of the present invention is that the various pipes and devices of the water provisioning system could be fully housed in the kitchen cabinet.

Yet another objective of the present invention is to provide the HMI as a friendly interface for information display, system configuration, and ozone release scheduling and control.

Still another objective of the present invention is to release ozone through an aeration pipe assembly into the kitchen cabinet at specific times so as to achieve deodorization and sterilization, and to expel various insects such as roaches.

One additional objective of the present invention is to recycle the 70% water from the RO water purification process that does not meet the drinking water standard for food cleaning and other function, so as to save water usage.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
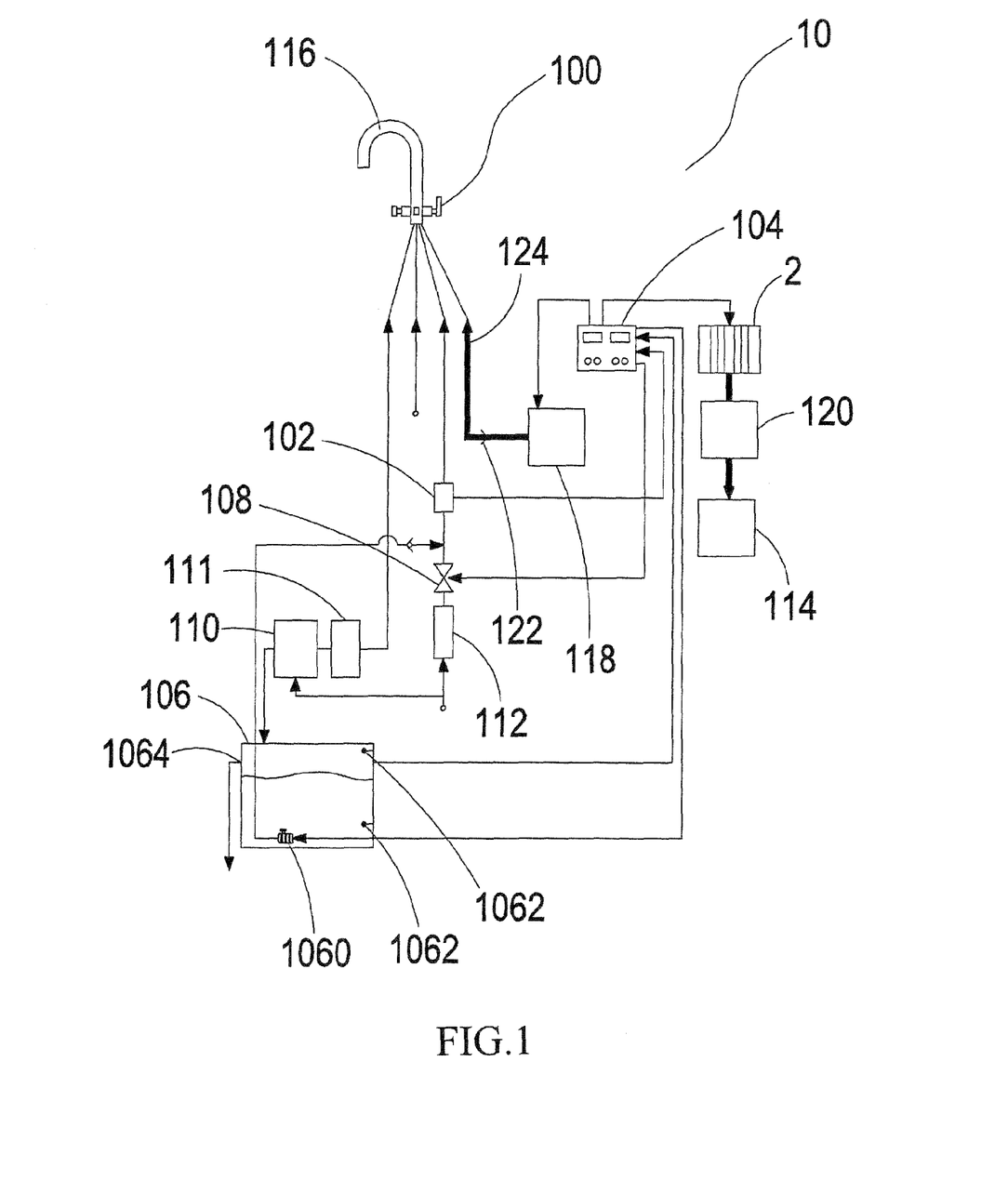
FIG. 1 is a schematic diagram showing the various components of a water provisioning system according to an embodiment of the present invention.
Figure 1A:
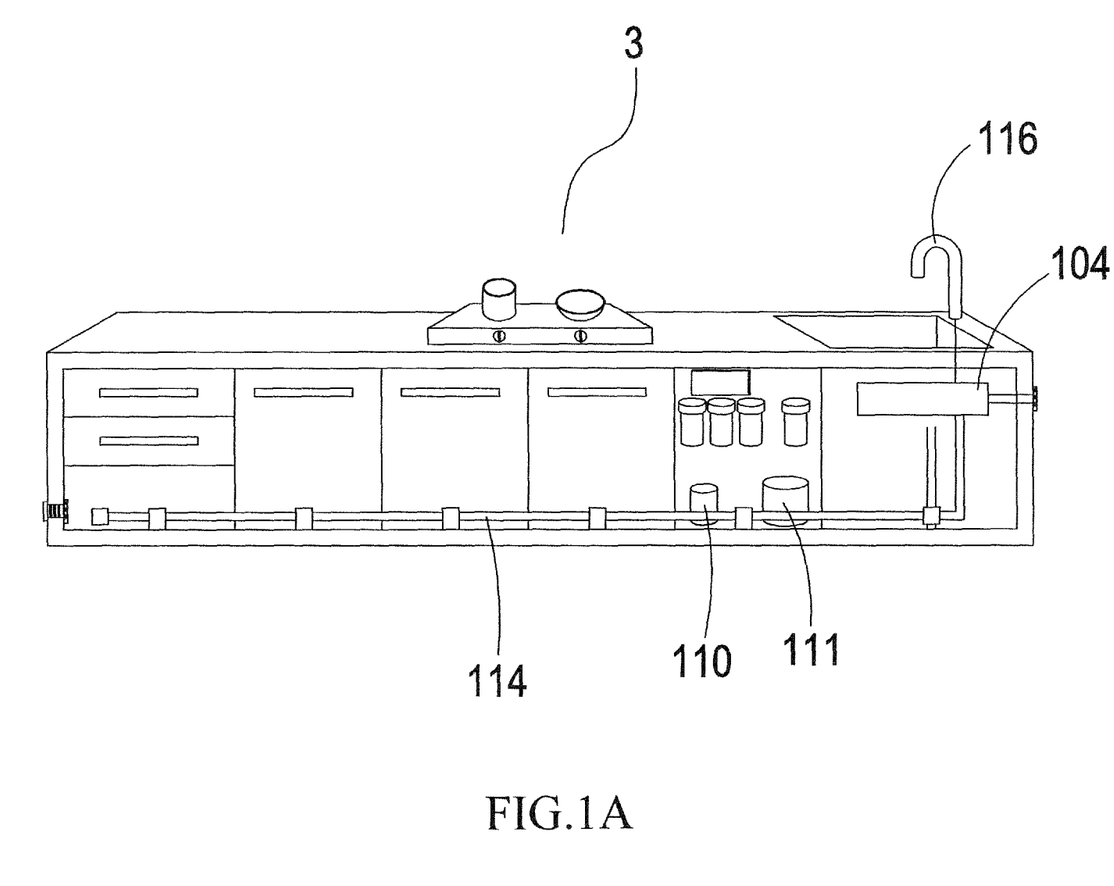
FIG. 1a is a schematic diagram showing the integration of the water provisioning system of FIG. 1 with a kitchen cabinet.
Figure 2:
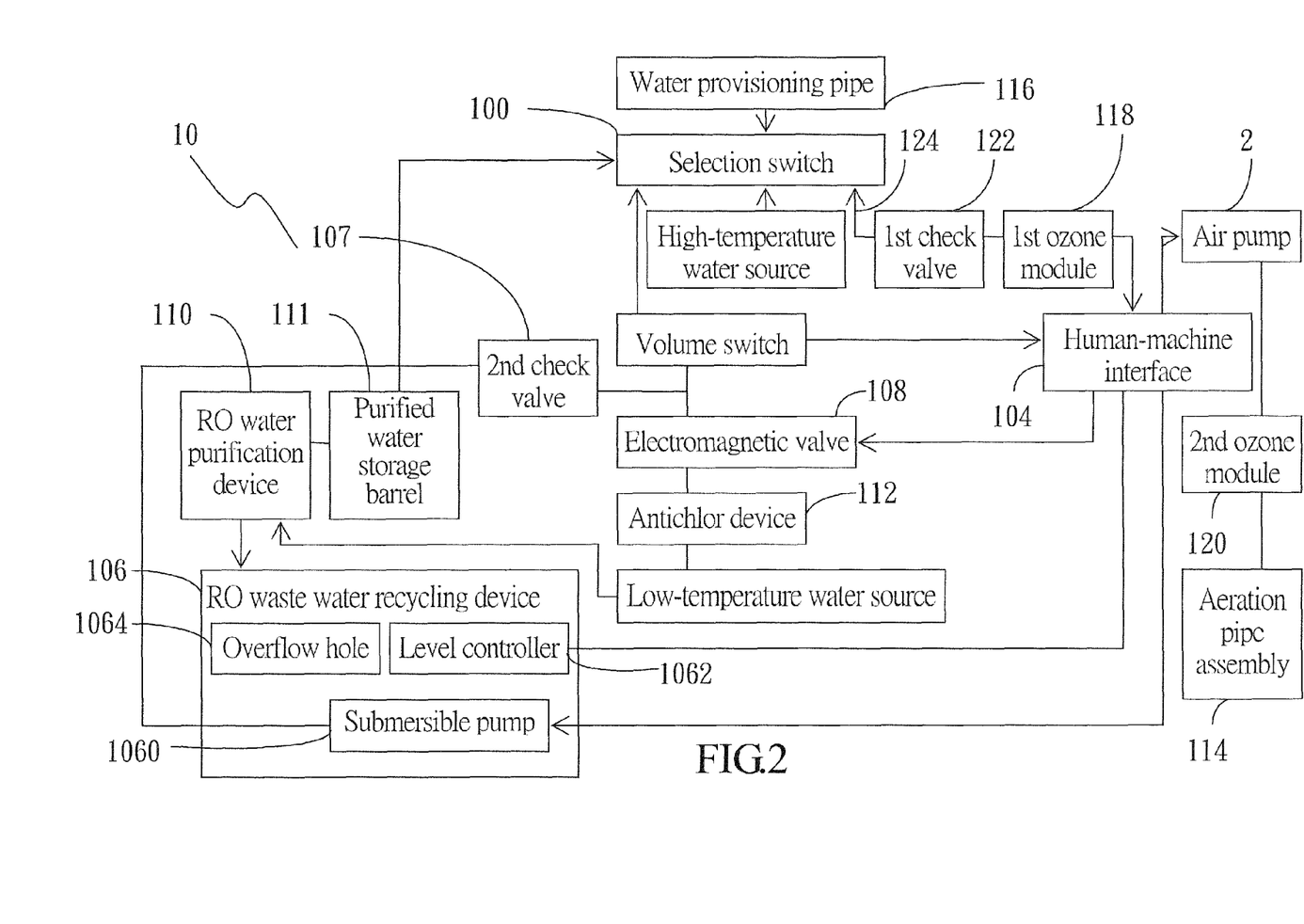
FIG. 2 is a schematic diagram showing the functional blocks of the water provisioning system of FIG. 1.
Figure 3:
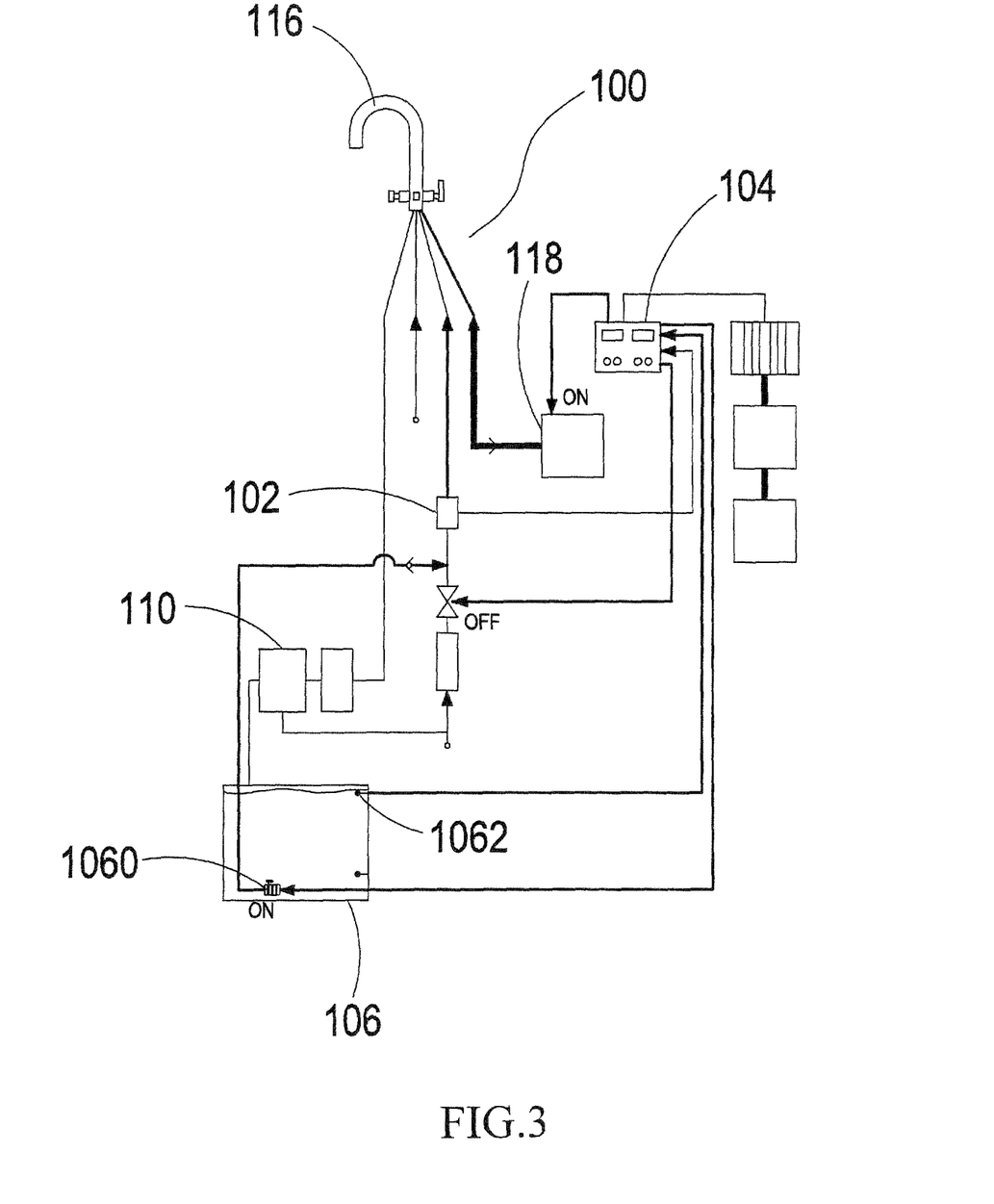
FIGS. 3, 3a, 3b, 4 and 5 are schematic diagrams showing scenarios of the water provisioning system of FIG. 1.
Figure 3A:
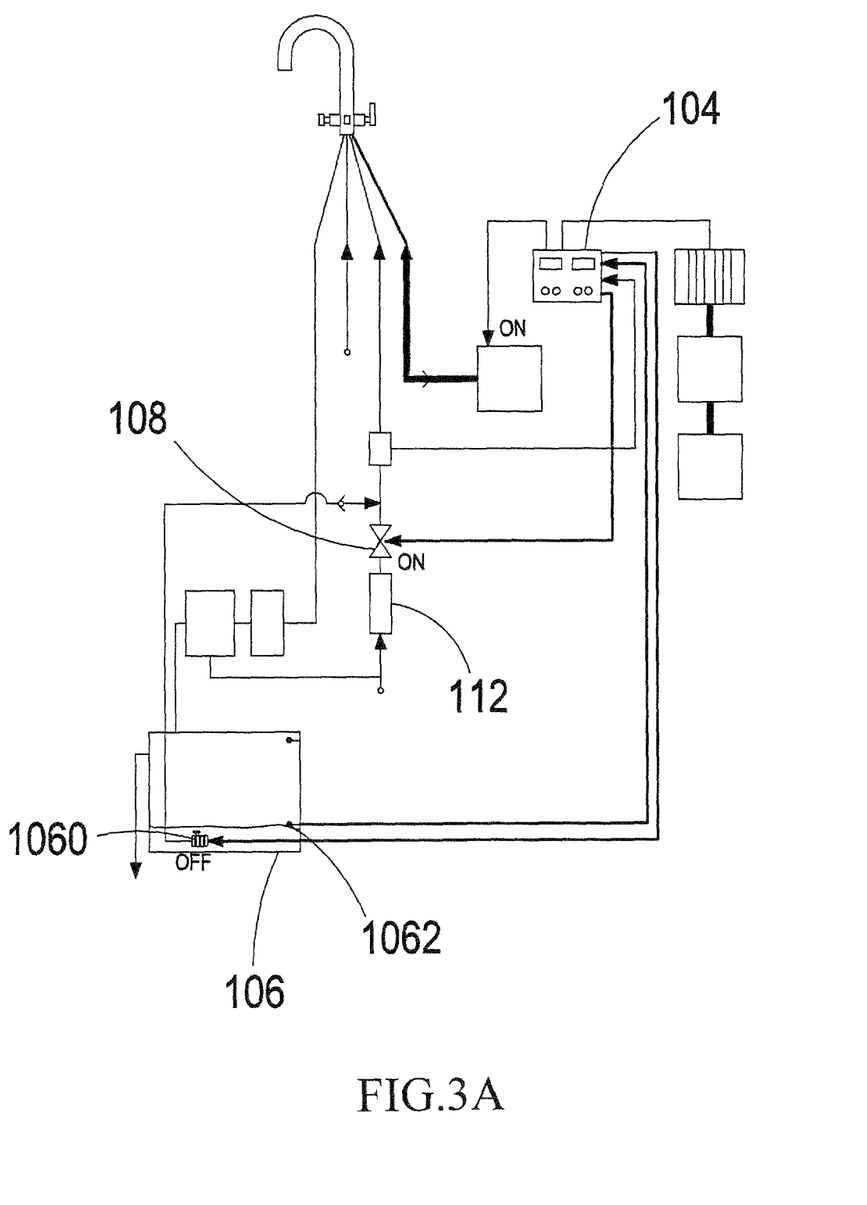
Figure 3B:
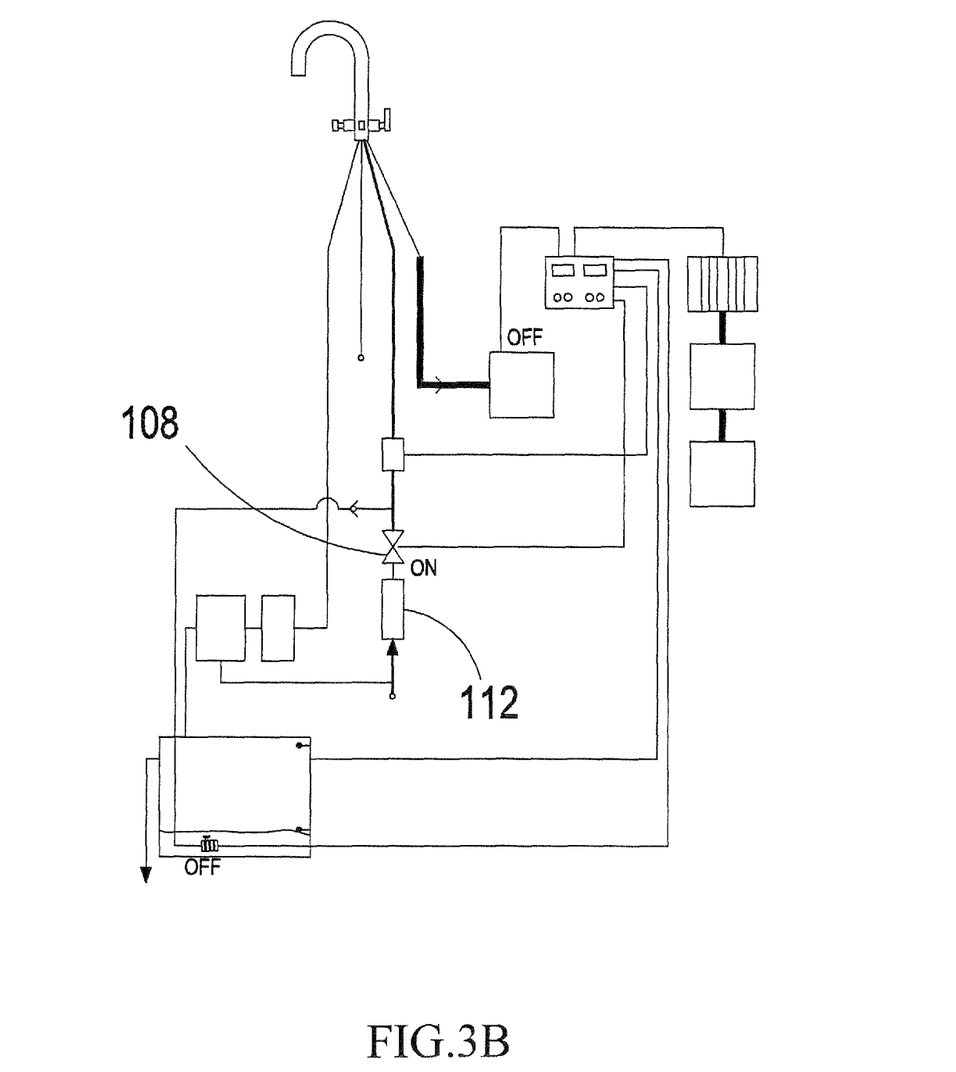
Figure 4:
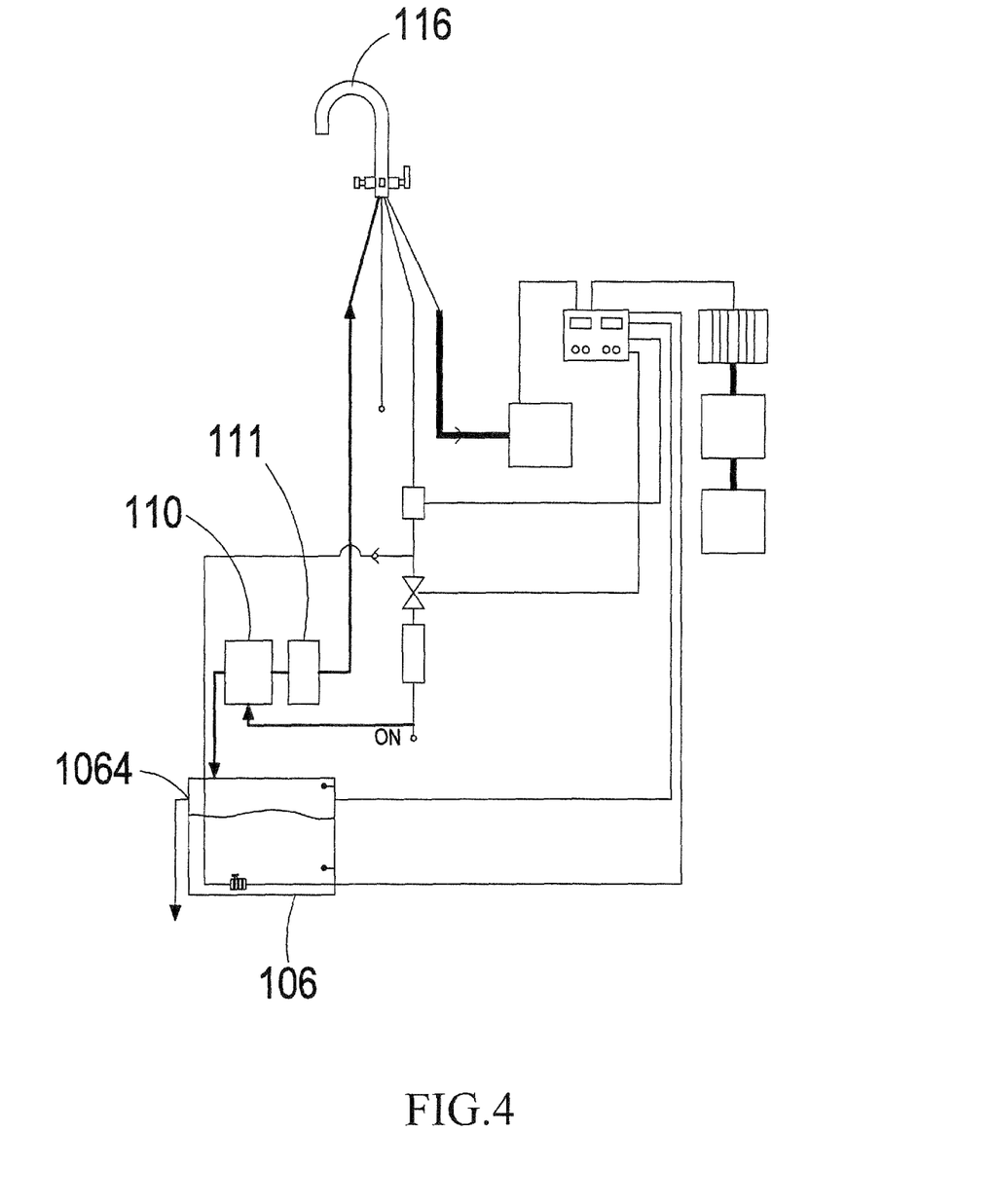
Figure 5:
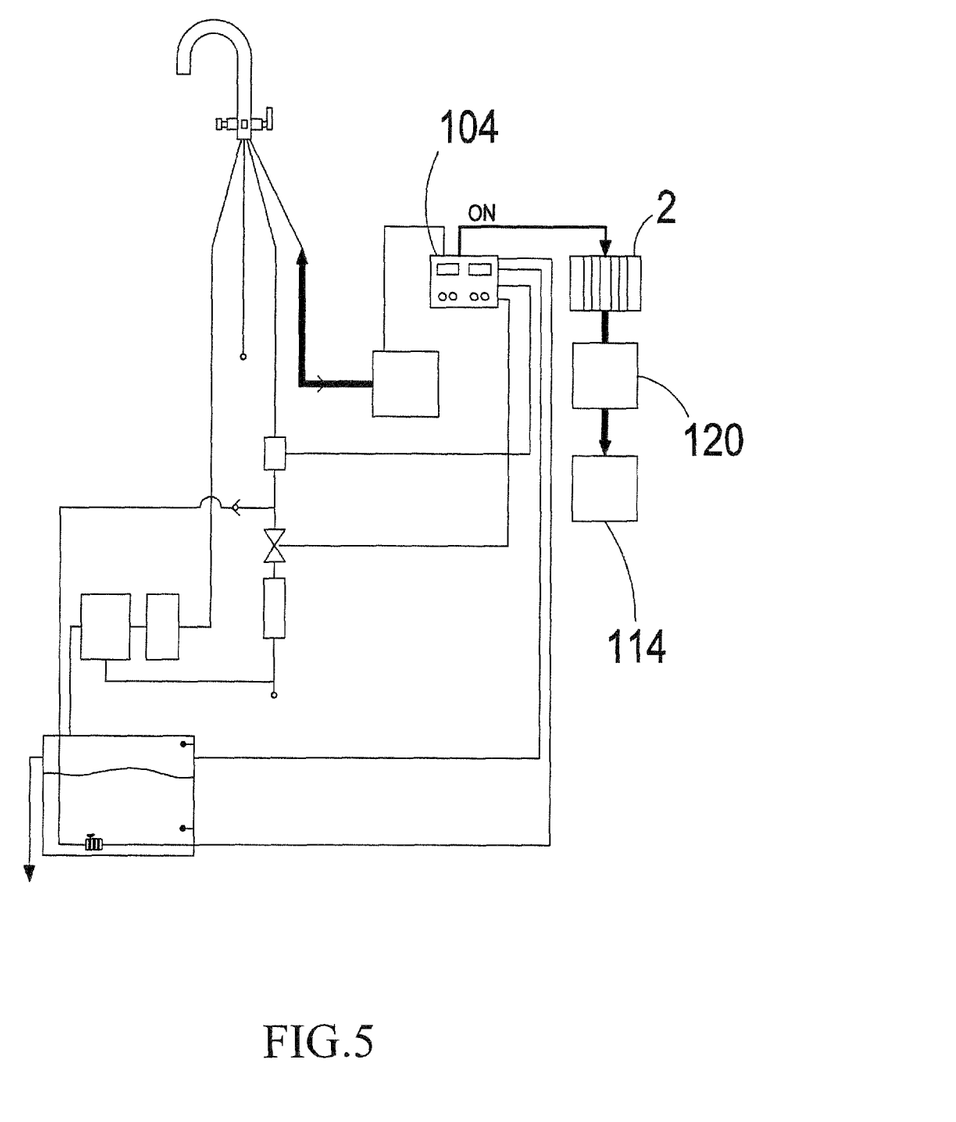

As shown in FIGS. 1, 1a, and 2, a water provisioning system 10 according to an embodiment of the present invention mainly contains a selection switch 100, a water volume switch 102, a human-machine interface (HMI) 104, a RO (reverse osmosis) waste water recycling device 106, and electromagnetic valve 108. Additionally, there are a RO water purification device 110, an antichlor device 112, an aeration pipe assembly 114. The selection switch 100 is configured on a water provisioning pipe 116 (e.g., a faucet), and the water volume switch 102 is able to detect the volume of water through the water provisioning pipe 116. The RO waste water recycling device 106 contains a submersible pump 1060, a level controller 1062, and an overflow hole 1064. The level controller 1062 contains a high-level control module and a low-level control module, and transmits a level signal to the HMI 104 in accordance with the amount of waste water in the RO waste water recycling device 106. The HMI 104 then opens or closes the electromagnetic valve 108 and turns the submersible pump 1060 on or off according to the level signal.

Both the RO water purification device 110 and the antichlor device 112 are connected to a low-temperature water source (i.e., tap water) (not numbered). When tap water is selected, the electromagnetic valve 108 is opened and the low-temperature water would flow through the antichlor device 112 and excessive chlorine in the low-temperature water is removed. When drinking water is selected, the low-temperature water would flow through the RO water purification device 110 and high-quality drinking water is available as such.

In addition, the HMI 104 is connected to a first ozone module 118 which is in turn connected to the water provisioning pipe 116 via a silicone pipe 124 with a built-in first check valve 122 and controlled by the selection switch 100. The HMI 104 is further connected, through an air pump 2, to a second ozone module 120 which is in turn connected to the aeration pipe assembly 114 installed within a kitchen cabinet 3.

The operation of the water provisioning system 10 is depicted in FIGS. 3, 3a, 3b, 4, and 5. First, a selection switch 100 is used to select and turn on a type of water to use, such as dechlorinated tap water, purified drinking water, ozonated water for food cleaning, etc. Assuming the ozonated water is selected, the selection switch 100 and the water volume switch 102 provide electrical signal to the HMI 104 which in turn detects the water level in RO waste water recycling device 106 through the level controller 1062. When the water in the RO waste water recycling device 106 is at a high level, the HMI 104 uses the water in the RO waste water recycling device 106 as the source for the ozonated water by turning off the electromagnetic valve 108 to prevent the water from the low-temperature water source to enter the water provisioning pipe 116, and then turning on the submersible pump 1060 to drive the water in the RO waste water recycling device 106 to the water provisioning pipe 116. The water in the RO waste water recycling device 106 is the 70% water produced from the RO water purification device 110 but not qualified for drinking. As such, the water is recycled for food cleaning so as to save water usage.

When the water in the RO waste water recycling device 106 reaches a low level, the level controller 1062 notifies the HMI 104 to turn off the submersible pump 1060 to stop using the water in the RO waste water recycling device 106. On the other hand, the HMI 104 turns on the electromagnetic valve 108, and the water from the low-temperature water source flows through the antichlor device 112 and as such is dechlorinated. A second check valve 107 is provided at the junction where a pipe from the RO waste water recycling device 106 converges with a pipe from the antichlor device 112. Therefore, then the water from the low-temperature water source flows through the antichlor device 112 and into the water provisioning pipe 116, it is prevented from entering the RO waste water recycling device 106.

As mentioned, the HMI 104 is connected to the first ozone module 118 which is in turn connected to the water provisioning pipe 116. When the selection switch 100 is turned to the ozonated water, the first ozone module 118 is also turned on by the HMI 104 and the produced ozone is mixed with the water from the RO waste water recycling device 106 or the dechlorinated water from the low-temperature water source. The water out of the water provisioning pipe 116 therefore has a superior cleaning effect.

When the water provisioning pipe 116 is turned off, only the electromagnetic valve 108 will be kept on. As such, when the water provisioning pipe 116 is turned on again, whether there is water flowing could be detected and malfunction could be prevented when the priority of using water from the RO waste water recycling device 106 or the water from the low-temperature water source cannot be determined when there is no water is the RO waste water recycling device 106.

Now, assuming the selection switch 100 is set to drinking water, the RO water purification device 110 is turned on and the water from the low-temperature water source is filtered and purified. The purified water thus produced is stored in a purified water storage barrel 111 connected to the water provisioning pipe 116. 70% of the water out the purification process would fail the drinking water standard and it is stored in the RO waste water recycling device 106 for further utilization. When there is too much water in the RO waste water recycling device 106, the excessive amount of water is drained by the overflow hole 1064 and the water level in the RO waste water recycling device 106 is effectively controlled.

As described, the HMI 104 is further connected, through the air pump 2, to the second ozone module 120 which is in turn connected to the aeration pipe assembly 114 installed within a kitchen cabinet 3. As such, a user is able to control, through the HMI 104, the time, frequency, and density of ozone release by the second ozone module 120 into the kitchen cabinet 3 so as to expel insects from the kitchen cabinet 3.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A water provisioning system for a kitchen cabinet, comprising:
    a selection switch integrated with a water provisioning pipe of said kitchen cabinet to select a type of water to use;
    a water volume switch connected to said water provisioning pipe to detect whether there is water flowing through;
    a human-machine interface (HMI) receiving a water flowing signal from said water volume switch;
    a RO waste water recycling device having a level controller sending a level signal to said HMI and a submersible pump controlled by said HMI to provide water in said RO waste water recycling device to said water provisioning pipe; and
    an electromagnetic valve between said-water volume switch and a low-temperature water source of said kitchen cabinet, said electromagnetic valve controlled by said HMI based on said water flowing signal.

2. The water provisioning system according to claim 1, further comprising a RO water purification device connected to said low-temperature water source.

3. The water provisioning system according to claim 2, wherein said RO water purification device provides purified water to a storage barrel connected to said water provisioning pipe; and RO water failing a drinking water standard is stored into said RO waste water recycling device.

4. The water provisioning system according to claim 1, further comprising an antichlor device between said low-temperature water source and said electromagnetic valve for dechlorination.

5. The water provisioning system according to claim 1, further comprising a first ozone module wherein said first ozone module is connected to said HMI and said water provisioning pipe, and is controlled by said selection switch.

6. The water provisioning system according to claim 5, wherein said first ozone module is connected to said water provisioning pipe via a silicone pipe having a first check valve.

7. The water provisioning system according to claim 1, further comprising an air pump and a second ozone module wherein said second ozone module is connected to said HMI via said air pump.

8. The water provisioning system according to claim 7, wherein said second ozone module is connected to an aeration pipe assembly.

9. The water provisioning system according to claim 8, wherein said aeration pipe assembly is installed inside said kitchen cabinet.

10. The water provisioning system according to claim 1, wherein said level controller comprises a high-level control module and a low-level control module.

11. The water provisioning system according to claim 1, wherein a second check valve is provided between said submersible pump and said water provisioning pipe to prevent water from said low-temperature water source from flowing into said RO waste water recycling device.

12. The water provisioning system according to claim 1, wherein said RO waste water recycling device has an overflow hole.

13. The water provisioning system according to claim 1, wherein said water provisioning pipe is a faucet of said kitchen cabinet.

* * * * *